(12) United States Patent
Vera et al.

(10) Patent No.: US 8,352,812 B2
(45) Date of Patent: Jan. 8, 2013

(54) PROTECTING DATA STORAGE STRUCTURES FROM INTERMITTENT ERRORS

(75) Inventors: Xavier Vera, Barcelona (ES); Jaume Abella, Barcelona (ES); Javier Carretero Casado, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 1186 days.

(21) Appl. No.: 11/833,765

(22) Filed: Aug. 3, 2007

(65) Prior Publication Data

US 2009/0037783 A1    Feb. 5, 2009

(51) Int. Cl.
*G11C 29/00* (2006.01)

(52) U.S. Cl. .......... 714/718; 714/6.1; 714/723; 714/805

(58) Field of Classification Search ................ 714/800, 714/805, 711, 718–723
See application file for complete search history.

(56) References Cited

U.S. PATENT DOCUMENTS

| | | | | |
|---|---|---|---|---|
| 7,200,770 B2* | 4/2007 | Hartwell et al. | ............ | 714/6.32 |
| 7,512,772 B2* | 3/2009 | Gschwind et al. | ............ | 712/227 |
| 7,555,692 B1* | 6/2009 | Iacobovici | .................... | 714/746 |
| 7,562,265 B2* | 7/2009 | Azevedo et al. | ................ | 714/55 |
| 2002/0016942 A1* | 2/2002 | MacLaren et al. | ............ | 714/718 |
| 2006/0156177 A1* | 7/2006 | Kottapalli et al. | ............ | 714/758 |

\* cited by examiner

*Primary Examiner* — Steve Nguyen
(74) *Attorney, Agent, or Firm* — Trop, Pruner & Hu, P.C.

(57) ABSTRACT

Embodiments of apparatuses and methods for protecting data storage structures from intermittent errors are disclosed. In one embodiment, an apparatus includes a plurality of data storage locations, execution logic, error detection logic, and control logic. The execution logic is to execute an instruction to generate a data value to store in one of the data storage locations. The error detection logic is to detect an error in the data value stored in the data storage location. The control logic is to respond to the detection of the error by causing the execution logic to re-execute the instruction to regenerate the data value to store in the data storage location, causing the error detection logic to check the data value read from the data storage location, and deactivating the data storage location if another error is detected.

5 Claims, 2 Drawing Sheets

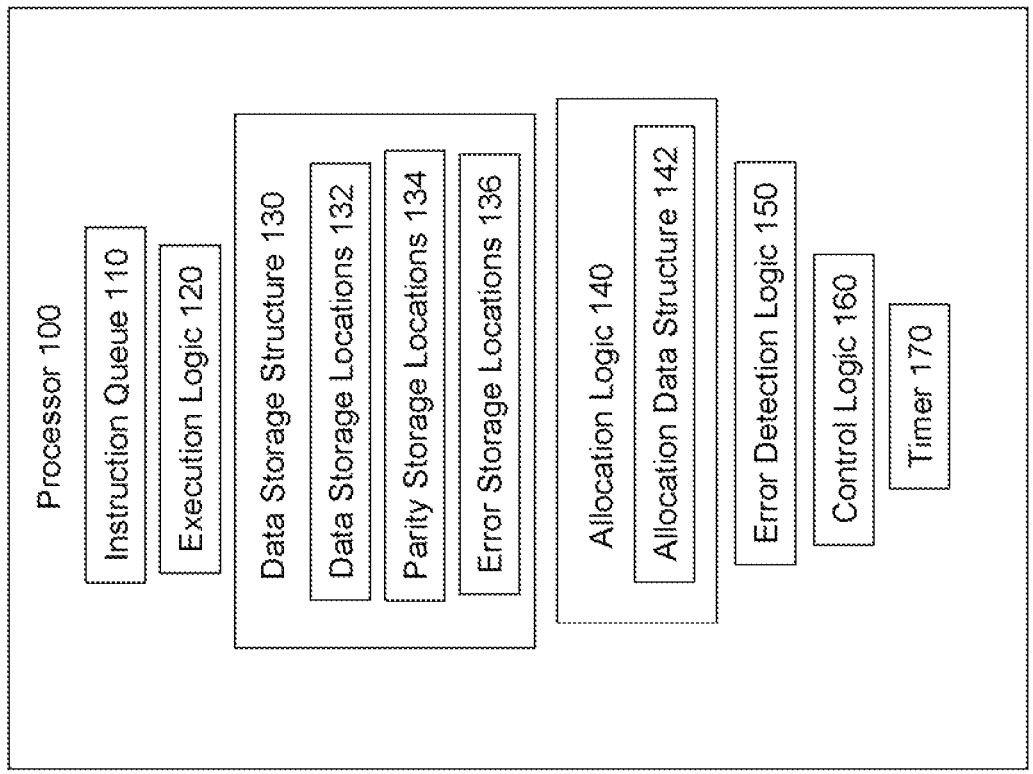

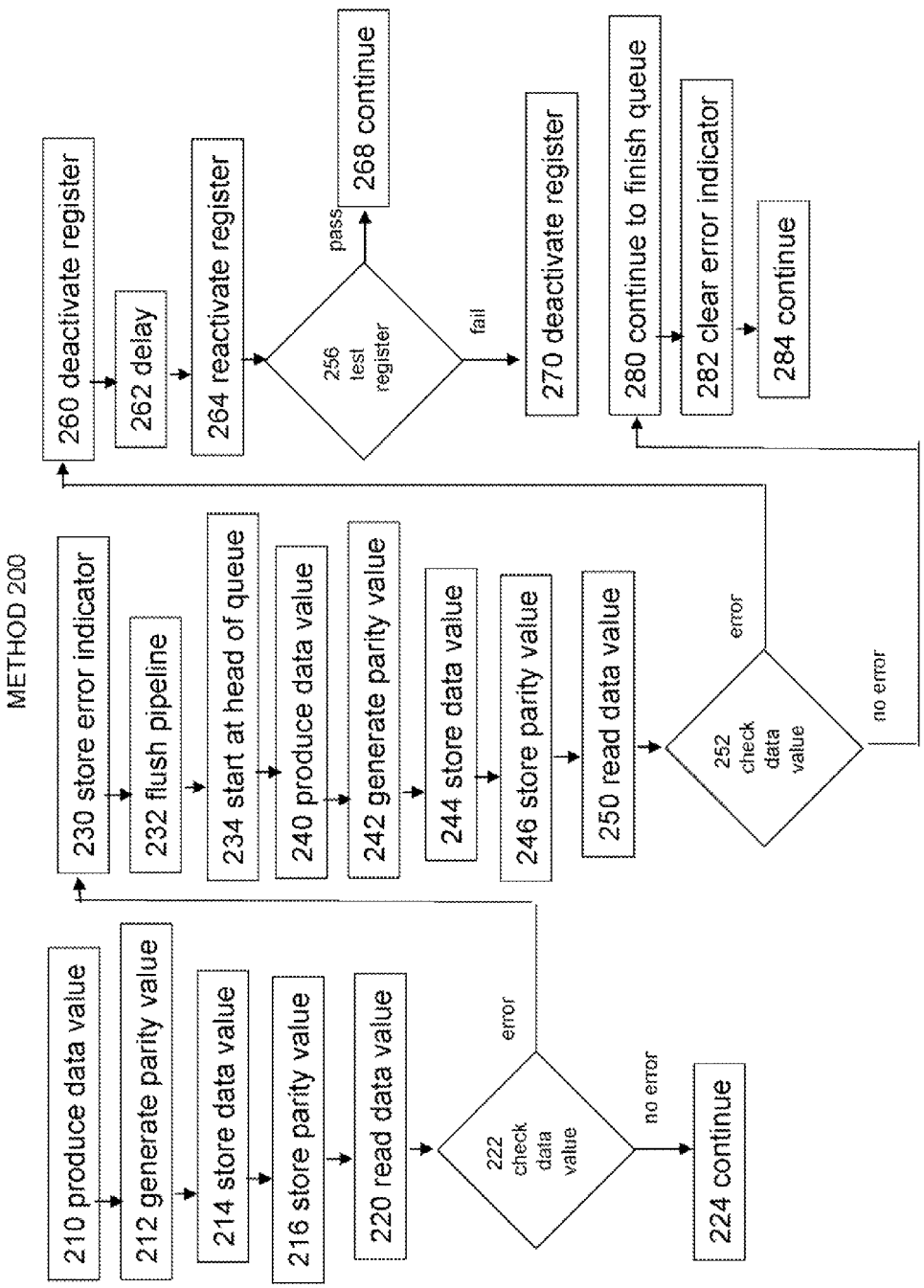

PROTECTING DATA STORAGE STRUCTURES FROM INTERMITTENT ERRORS

BACKGROUND

Data storage structures in information processing systems may be affected by different types of errors. Any of these types of errors may make the information processing systems unreliable if the data storage structures are not protected with parity-based or other error detection and/or correction techniques, by changing the values of stored data. However, the storage structures themselves may be affected differently by different types of errors. Hard errors caused by physical defects may render the storage structure permanently unreliable. Soft errors caused by particle strikes may change the value of stored data, but new data may be stored in the same location with no loss of reliability.

In between hard errors and soft errors in terms of reliability, intermittent errors may result from the effects of transient gate oxide leakage current. Transient gate oxide leakage currents may cause the minimum operating voltage at which circuits operate to vary non-deterministically, therefore, even with a guardband applied to the minimum operating voltage specification, nodes within storage structures may become temporarily stuck at a high or a low level. The incidence of intermittent errors is expected to increase as advances in integrated circuit manufacturing provide for smaller circuit dimensions, thinner gate oxides, and reduced operating voltage levels. Low latency data storage structures, such as register files, may be most affected by an increase in intermittent error rates, because they are typically not fully protected by error correction techniques due to the area and delay costs associated with these techniques.

BRIEF DESCRIPTION OF THE FIGURES

The present invention is illustrated by way of example and not limitation in the accompanying figures.

FIG. 1 illustrates a processor including a data storage structure protected from intermittent errors according to an embodiment of the present invention.

FIG. 2 illustrates a method for protecting a data storage structure from intermittent errors according to an embodiment of the present invention.

DETAILED DESCRIPTION

Embodiments of apparatuses and methods for protecting data storage structures from intermittent errors are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention may provide for distinguishing between soft errors and intermittent errors in a data storage location, such as a register in a register file. In one embodiment, if a soft error is detected, the register may continue to be used, but if an intermittent error is detected, the register may be temporarily removed from a list of available registers.

FIG. 1 illustrates a processor including a data storage structure protected from intermittent errors according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processor 100 may include multiple threads or multiple cores in any combination.

Processor 100 includes instruction queue 110, execution logic 120, data storage structure 130, allocation logic 140, error detection logic, 150, control logic 160, and timer 170. Processor 100 may include any other circuits, structures, or logic not shown in FIG. 1.

Instruction queue 110 may include any circuitry or logic to hold instructions for execution by execution logic 120, such as an instruction re-order buffer. Execution logic 120 may include any circuitry or logic to execute instructions, such as one or more pipelined and/or multithreaded execution units. Data storage structure 130 may include any circuitry or structures to store data, such as a register file or a data storage portion of an instruction re-order buffer.

Allocation logic 140 may include any circuitry or logic to allocate storage locations in data storage structure 130 to store data generated by execution logic 120 or otherwise being stored as the result of the execution of an instruction. The operation of allocation logic 140 may include any known techniques or combination of known techniques, such as allocation based on instruction types or instruction flow, allocation based on architectural register names or physical register identifiers, allocation based on data value type or expected useful life in a register (i.e., delay between production and consumption), and any form of register renaming. Allocation logic 140 may include allocation data structure 142. In one embodiment, allocation data structure 142 may be used to store a list of data storage locations in data storage structure 130 that are available to be allocated. In another embodiment, allocation data structure 142 may be used to store a list of data storage locations in data storage structure 130 that are not available to be allocated. In another embodiment, allocation data structure 142 may be used to store a list of all data storage locations in data storage structure 130 and an associated indicator for each data storage location to indicate whether the data storage location is available or unavailable. In another embodiment, allocation logic 142 may not include allocation data structure 142, but may refer to an allocation or other data structure elsewhere in processor 100 or in a component or storage medium accessible to processor 100.

Error detection logic 150 may include any circuitry or logic to detect errors in data. For example, error detection logic 150 may generate one or more parity bits or values for data values to be stored in data storage structure 130. The parity generation may be performed at any time relative to the execution of the instruction associated with the generation of the data value and the storage of the data of the data value. For example, a parity value may be generated in parallel with the generation of the data value, before the data value is stored, or after the data value is stored. The parity values may be used to detect errors in data values read from data storage structure 130. In some embodiments, the parity values may also be used to correct errors in data values read from data storage structure 130, according to an error correction code (ECC) or any other such technique. Accordingly, the term "parity value" is intended to include a single parity bit, multiple parity bits, one or more ECC values, or any other value that may be used to detect and/or correct errors in data values.

To store parity values, data storage structure 130 may include a number of parity storage locations 134, where each parity storage location may be associated with one or more data storage locations 132. Alternatively, parity values may be stored in any other data storage location accessible to processor 100, such as a separate protection table within error detection logic 150. Within the scope of the present invention, all or any subset of the data storage locations 132 may be protected by error detection and/or correction.

Selective protection techniques are possible, wherein different data storage locations may be protected using different approaches. For example, in an embodiment where data storage structure 130 is a register file, processor 100 may include sufficient parity value storage space and error detection logic to protect every register at least with parity based protection, and may also include parity value storage space and error correction logic to protect a subset of the registers with ECC. The assignment of the ECC protection resources to registers may be performed according to any approach by allocation logic 140, including a static approach where certain registers are always protected by ECC, a dynamic approach where the ECC protection resources may be assigned to certain registers and reassigned to other registers during the execution of an instruction stream based on the expected useful life of the data value in the register or any other factors, a pseudo-dynamic approach where ECC protection resources are always assigned to certain registers but the allocation of instructions and/or data values to each register depends on the expected useful life of the data value in the register or any other factors.

If error detection logic 150 detects an error in a data value, error detection logic 150 may generate an error value to indicate that an error has been detected. To store these error values, data storage structure 130 may include a number of error storage locations 136, where each error storage location may be associated with one of the data storage locations 132. Alternatively, error values may be stored in any other data storage location accessible to processor 100, such as a separate storage structure within error detection logic 150.

Control logic 160 may include any form of circuitry, structure, or logic, including state machine logic, microcode, programmable logic, firmware, or software, that causes processor 100 to execute method embodiments of the present invention, and/or causes processor 100 to access any such circuitry, structure, or logic that causes or instructs processor 100 to execute method embodiments of the present invention. In one embodiment, control logic 160 is to cause processor 100 to respond to the detection of an error in a data value read from a data storage location by re-executing the instruction that generated the data value, storing the re-generated data value in the same data storage location, reading the data value from the data storage location, checking the data value, and deactivating the data storage location if another error is detected. Functions performed by control logic 160 may be performed by any combination of separate logical or functional units and integrated logical or functional units, where any of these logical or functional units may also perform other functions.

Processor 100 may also include timer 170 to measure an interval of time, for example by counting processor clock cycles, or to measure the passing of any other period of delay, for example by counting instructions issued, executed, or retired. Timer 170 may be used by control logic 160 to measure a time interval or other period of delay as needed to perform method embodiments of the present invention.

FIG. 2 illustrates method 200 for protecting a data storage structure from intermittent errors according to an embodiment of the present invention. Although method embodiments of the present invention are not limited in this respect, reference is made to processor 100 of FIG. 1 to describe method embodiment 200.

In box 210, a producer instruction from an instruction sequence in instruction queue 110 is executed by execution logic 120 to produce a data value. In box 212, error detection logic 150 generates a parity value based on the data value. In box 214, the data value is stored in a first storage location in data storage structure 130. In box 216, the parity value is stored in a parity value storage location associated with the first storage location.

In box 220, the data value is read from data storage structure 130 in connection with executing a consumer instruction from instruction queue 110. In box 222, error detection logic 150 checks the data value for an error, for example, by checking for correct parity across the data value and the parity value. If an error is detected, then method 200 continues in box 230. If an error is not detected, then in box 224, instructions continue to be executed in order.

In box 230, an indication that the first data storage location is defective is stored in an error value storage location associated with the first data storage location. In box 232, the execution pipeline of processor 100 is flushed. In box 234, the instruction sequence is re-executed, starting from the beginning of instruction queue 110.

In box 240, re-execution of the producer instruction again produces the data value. In box 242, error detection logic 150 again generates the parity value based on the data value again. In box 244, the data value is again stored in the first storage location in data storage structure 130. In box 246, the parity value is again stored in the parity value storage location associated with the first storage location.

In box 250, the data value is again read from data storage structure 130 in connection with re-executing the consumer instruction from instruction queue 110. In box 252, error detection logic 150 again checks the data value for an error. If an error is again detected, the error is presumably an intermittent or a permanent error, and method 200 continues in box 260. If an error is not detected, the error detected is in box 222 was presumably a soft error, and method 200 continues in box 280.

In box 260, the first data storage location is deactivated, for example by adding an identifier associated with the first data storage location to an inactive list in data structure 142. In box 262, a first delay interval is measured. The length of the first delay interval may be chosen as a design parameter and may be measured using timer 170. In box 264, the first data storage location is reactivated after the first delay interval. In box 266, the first data storage location may be tested to ensure that it is functional after the first delay interval. If the first data storage location is functional, then, in box 268, instructions continue to be executed in order, as it may be presumed that the error was intermittent and has gone away. Otherwise, in box 270, the first data storage location may be returned to the inactive list, as it may be presumed that the error was permanent or was an intermittent error that has not yet gone away. To provide for the latter possibility, box 264 may be accomplished by removing all storage locations from the inactive list from time to time.

In box 280, execution of instructions continues for a second delay interval. The length of the second delay interval may be chosen as a design parameter, such as to allow enough time for the number of instructions that may be held in instruction queue 110 to be executed, to ensure that the producer instruction and the consumer instruction have both been re-executed without the detection of an error. In box 282, the contents of the error value storage location associated with the first data storage location are changed to indicate that the first data storage location is not defective. In box 284, instructions continue to be executed in order.

Within the scope of the present invention, the method illustrated in FIG. 2 may be performed in a different order, performed with illustrated boxes omitted, performed with additional boxes added, or performed with a combination of reordered, omitted, or additional boxes. For example, box 266 may be omitted such that a register that has suffered from an error may be returned to operation without being tested. In this case, ECC may be used for this register for a period of time after reactivation in case the error has not gone away.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices in the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for protecting data storage structures from intermittent errors have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a plurality of data storage locations;
   execution logic to execute an instruction to generate a data value to store in one of the data storage locations;
   error detection logic to detect a first error in the data value stored in the data storage location and store an indication that the data storage location is defective;
   a timer to measure a first delay interval and a second delay interval; and
   control logic to respond to the detection of the first error by causing the execution logic to re-execute the instruction to regenerate the data value to store in the data storage location, causing the error detection logic to check the data value read from the data storage location, deactivating the data storage location and reactivating the data storage location after the first delay interval if a second error is detected, and changing the indication that the data storage location is defective after the second delay interval if a second error is not detected.

2. The apparatus of claim 1, further comprising a parity storage location associated with the data storage location to store a parity value generated by the error detection logic based on the data value.

3. The apparatus of claim 1, further comprising an error storage location associated with the data storage location to store an error indicator to indicate the detection of the first error.

4. The apparatus of claim 1, further comprising an instruction queue, wherein the control logic is to cause the execution logic to re-execute the instruction to regenerate the data value to store in the data storage location by flushing an execution pipeline and re-executing from the beginning of the instruction queue.

5. The apparatus of claim 1, further comprising allocation logic to allocate the plurality of data storage locations to data generated by the execution logic, wherein the control logic is to deactivate a storage location by storing an indication that the storage location is unavailable in a data structure used by the allocation logic.

* * * * *